United States Patent
Yamada et al.

(10) Patent No.: US 9,958,752 B2
(45) Date of Patent: May 1, 2018

(54) ELECTROPHORESIS DISPLAY DEVICE AND ELECTRONIC APPARATUS

(71) Applicant: Seiko Epson Corporation, Tokyo (JP)

(72) Inventors: Tadashi Yamada, Matsumoto (JP);
Kiyoshi Nakamura, Matsumoto (JP);
Saichi Hirabayashi, Chino (JP);
Nobukazu Nagae, Shiojiri (JP); Toru Katakabe, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 10 days.

(21) Appl. No.: 15/207,854

(22) Filed: Jul. 12, 2016

(65) Prior Publication Data
US 2017/0031228 A1   Feb. 2, 2017

(30) Foreign Application Priority Data

Jul. 29, 2015 (JP) ................. 2015-150060

(51) Int. Cl.
| G02B 26/00 | (2006.01) |
| G02B 26/08 | (2006.01) |
| G02F 1/29 | (2006.01) |
| G02F 1/167 | (2006.01) |
| G02F 1/1339 | (2006.01) |

(52) U.S. Cl.
CPC ............ *G02F 1/167* (2013.01); *G02F 1/1339* (2013.01); *G02F 2001/1672* (2013.01)

(58) Field of Classification Search
USPC ........ 359/237, 242–245, 267–273, 315–317, 359/321, 322, 290–292, 295, 296, 298
See application file for complete search history.

(56) References Cited

U.S. PATENT DOCUMENTS

| 2004/0155857 A1* | 8/2004 | Duthaler ............... G02F 1/1334 345/107 |
| 2008/0174853 A1* | 7/2008 | Danner .................. G02B 1/105 359/296 |
| 2009/0244811 A1* | 10/2009 | Pascenko ................. H01G 2/16 361/525 |
| 2013/0265515 A1* | 10/2013 | Hasegawa ......... G02F 1/134336 349/43 |
| 2015/0015934 A1 | 1/2015 | Yamada et al. |
| 2015/0287959 A1* | 10/2015 | Hanamura .......... H01L 51/5246 257/40 |

FOREIGN PATENT DOCUMENTS

| JO | 2000-294982 | * 4/1999 | ............... G09F 9/00 |
| JP | 2003-15166 A | 1/2003 | |
| JP | 2013-41036 A | 2/2013 | |
| JP | 2015-138220 A | 7/2015 | |

* cited by examiner

*Primary Examiner* — Brandi Thomas
(74) *Attorney, Agent, or Firm* — ALG Intellectual Property, LLC

(57) ABSTRACT

An electrophoresis display device includes an element substrate (first substrate); a counter substrate (second substrate) arranged facing the element substrate; an electrophoresis layer arranged between the element substrate and the counter substrate and which includes a dispersion liquid which contains electrophoretic particles and a dispersion medium in which the electrophoretic particles are dispersed; a dividing wall arranged to partition the electrophoresis layer into a plurality of cells; and a sealing layer arranged between the counter substrate and the dividing wall. The sealing layer has a modulus of elasticity at 25° C. of 1 MPa or more to 100 MPa or less.

18 Claims, 9 Drawing Sheets

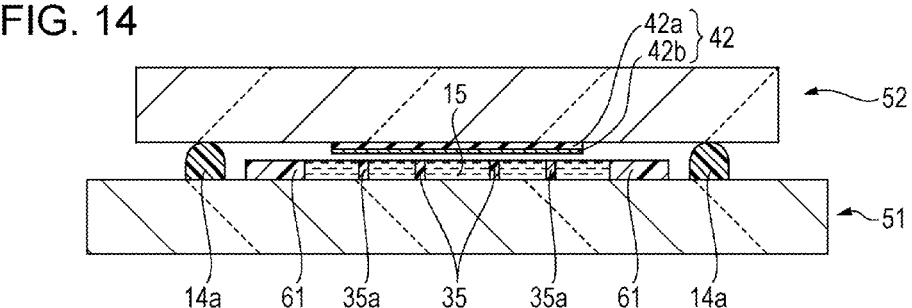
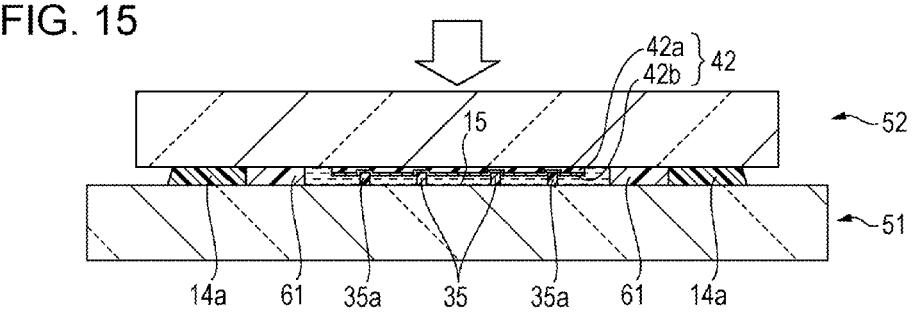
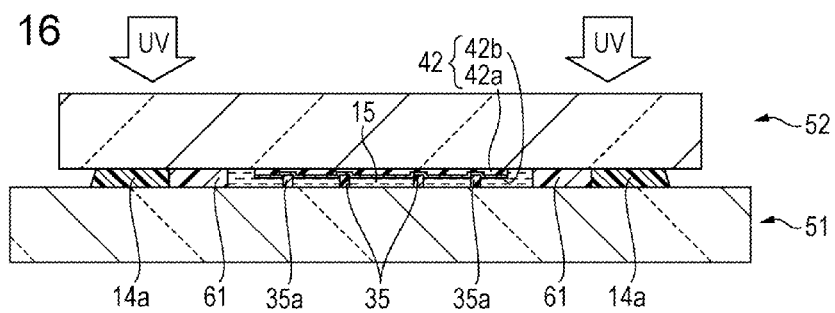
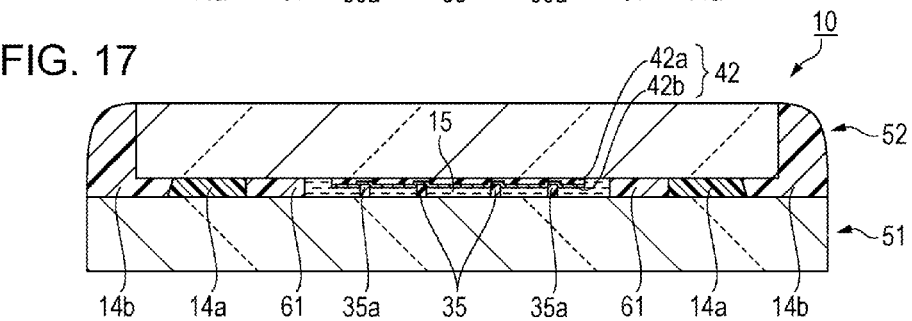

ELECTROPHORESIS DISPLAY DEVICE AND ELECTRONIC APPARATUS

BACKGROUND

1. Technical Field

The present invention relates to an electrophoresis display device and an electronic apparatus.

2. Related Art

Electrophoresis display devices which employ electrophoresis of particles are known in the related art, and such electrophoresis display devices have superior features of portability and energy efficiency.

In an electrophoresis display device, an image is formed in a display region by applying a voltage between opposing pixel electrodes, with the electrophoresis dispersion liquid which includes electrophoretic particles interposed therebetween, and a common electrode and causing the charged electrophoretic particles, such as black particles and white particles, to move spatially. An electrophoresis display device is known in which the space between a pair of substrates is divided by a dividing wall into a plurality of spaces, and an electrophoresis dispersion liquid which includes electrophoretic particles and a dispersion medium is sealed in each space.

As disclosed in JP-A-2013-41036, because such an electrophoresis display device seals the electrophoresis dispersion liquid (electrophoresis ink) in the interior of a space (cell) without a gap, a technology has been disclosed in which the apex of the dividing wall bites into the adhesive layer adhered to the substrate, and the sealing properties of the space are high.

However, in the electrophoresis display device, although expansion and contraction in the volume of the electrophoresis dispersion liquid occurs due to temperature changes in the environment, even if the sealing properties of the space are high, as described above, air bubbles may be generated by the volume of the electrophoresis dispersion liquid contracting, particularly at low temperatures.

As the air bubbles, vacuum bubbles due to contraction of the volume of the electrophoresis dispersion liquid occur as a result of removing the gas component from the structural material which forms the electrophoresis dispersion liquid. Therefore, even when the temperature returns from a low temperature to room temperature, air bubbles remain in the electrophoresis dispersion liquid, and, as a result, a problem arises in which the display characteristics of the electrophoresis dispersion device decline remarkably.

SUMMARY

An advantage of some aspects of the invention is that an electrophoresis display device that is able to suppress or prevent the generation of air bubbles in the electrophoresis dispersion liquid and which exhibits superior display characteristics and a highly reliable electronic apparatus is provided.

This advantage is realized by the invention described below.

According to an aspect of the invention, there is provided an electrophoresis display device including a first substrate; a second substrate arranged facing the first substrate; an electrophoresis layer arranged between the first substrate and the second substrate and which includes a dispersion liquid that contains electrophoretic particles and a dispersion medium; a dividing wall arranged to partition the electrophoresis layer into a plurality of cells; and a sealing layer arranged between the second substrate and the dividing wall, in which the sealing layer has a modulus of elasticity at 25° C. of 1 MPa or more to 100 MPa or less.

Accordingly, even if the dispersion liquid contracts in volume due to the electrophoresis display device being exposed to a low temperature (for example, approximately −30° C.) environment, the sealing layer can deform in accordance with the contraction in volume. Accordingly, since the generation of air bubbles from the dispersion liquid due to the contraction of the volume can be effectively suppressed or prevented, superior display qualities can be maintained in the electrophoresis display device over the long term.

In the electrophoresis display device according to this aspect, it is preferable that the sealing layer have an average film thickness of ⅕ or more of the average film thickness of the electrophoresis layer.

Accordingly, by the sealing layer deforming in accordance with the contraction in the volume of the dispersion liquid, the generation of air bubbles in the dispersion liquid can be effectively suppressed or prevented.

In the electrophoresis display device of this aspect, it is preferable that the sealing layer have a lower volume resistivity than the volume resistivity of the dispersion liquid.

Accordingly, even if the sealing layer is interposed between the first substrate and the second substrate, lowering of the mobility of the electrophoretic particles in the electrophoresis layer can be effectively suppressed or prevented.

In the electrophoresis display device of this aspect, it is preferable that a portion that overlaps the dividing wall in plan view from a contact surface of the sealing layer and the electrophoresis layer be positioned closer to the second substrate side in cross-sectional view than a portion not overlapping the dividing wall in plan view, and an apex of the dividing wall thereby bites into the sealing layer.

In this way, by causing the apex of the dividing wall to bite into the sealing layer, entering and exiting between adjacent cells of the dispersion liquid that fills the closed space divided by the sealing layer, the first substrate, and the dividing wall can be effectively suppressed or prevented.

In the electrophoresis display device of this aspect, it is preferable that the sealing layer be a stacked body that includes a first sealing layer positioned on the second substrate side and a second sealing layer positioned on the electrophoresis layer side.

In the electrophoresis display device of this aspect, it is preferable that the first sealing layer have a modulus of elasticity at 25° C. of 5 MPa or more to 40 MPa or less.

Accordingly, the modulus of elasticity of the sealing layer as a stacked body, that is, the entire sealing layer, can be easily set to within a range of 1 MPa or more to 100 MPa or less.

In the electrophoresis display device of this aspect, it is preferable that the second sealing layer have a modulus of elasticity at 25° C. of 50 MPa or more to 10 GPa or less.

Accordingly, the modulus of elasticity of the sealing layer as a stacked body, that is, the entire sealing layer, can be easily set to within a range of 1 MPa or more to 100 MPa or less.

In the electrophoresis display device of the aspect, it is preferable that the first sealing layer have an average film thickness of 2.5 µm or more to 20 µm or less.

Accordingly, the modulus of elasticity of the sealing layer as a stacked body, that is, the entire sealing layer, can be easily set to within a range of 1 MPa or more to 100 MPa or less.

In the electrophoresis display device of this aspect, it is preferable that the second sealing layer have an average film thickness of 0.05 µm or more to 1.0 µm or less.

Accordingly, the modulus of elasticity of the sealing layer as a stacked body, that is, the entire sealing layer, can be easily set to within a range of 1 MPa or more to 100 MPa or less.

In the electrophoresis display device of this aspect, it is preferable that the first sealing layer have a volume resistivity of $1 \times 10^7$ Ω·cm or more to $5 \times 10^{10}$ Ω·cm or less.

Accordingly, since the volume resistivity of the sealing layer as a stacked body, that is, the entire sealing layer, can be easily set to within a range of $1 \times 10^7$ Ω·cm or more to $1 \times 10^{12}$ Ω·cm or less, lowering of the mobility of the electrophoretic particles due to interposing the sealing layer between the first substrate and the second substrate can be effectively suppressed or prevented.

In the electrophoresis display device of this aspect, it is preferable that the second sealing layer have a volume resistivity of $1 \times 10^7$ Ω·cm or more to $2 \times 10^{11}$ Ω·cm or less.

Accordingly, since the volume resistivity of the sealing layer as a stacked body, that is, the entire sealing layer, can be easily set to within a range of $1 \times 10^7$ Ω·cm or more to $1 \times 10^{12}$ Ω·cm or less, lowering of the mobility of the electrophoretic particles due to interposing the sealing layer between the first substrate and the second substrate can be effectively suppressed or prevented.

According to another aspect of the invention, there is provided an electronic apparatus provided with the electrophoresis display device of the aspect of the invention.

Accordingly, an electronic apparatus having excellent capability and reliability is obtained.

BRIEF DESCRIPTION OF THE DRAWINGS

The invention will be described with reference to the accompanying drawings, wherein like numbers reference like elements.

FIG. 14 is a schematic cross-sectional view for describing the method of manufacturing the electrophoresis display device illustrated in FIG. 3.

FIG. 15 is a schematic cross-sectional view for describing the method of manufacturing the electrophoresis display device illustrated in FIG. 3.

FIG. 16 is a schematic cross-sectional view for describing the method of manufacturing the electrophoresis display device illustrated in FIG. 3.

FIG. 17 is a schematic cross-sectional view for describing the method of manufacturing the electrophoresis display device illustrated in FIG. 3.

DESCRIPTION OF EXEMPLARY EMBODIMENTS

Below, a detailed description will be provided of the electrophoresis display device and the electronic apparatus of the invention based on preferred embodiments illustrated in the attached drawings.

Moreover, in the following forms, for example, a case where "on a substrate" is disclosed includes a case where a constituent component is arranged so as to contact the top of the substrate, a case where arranged via another constituent component on top of the substrate, and a case where a portion thereof is arranged so as to contact the top of the substrate and a portion is arranged via another constituent component.

Electronic Apparatus

First, prior to describing the electrophoresis display device of the invention, the electronic apparatus (electronic apparatus of the invention) provided with the electrophoresis display device of the invention will be described.

Figure 1:
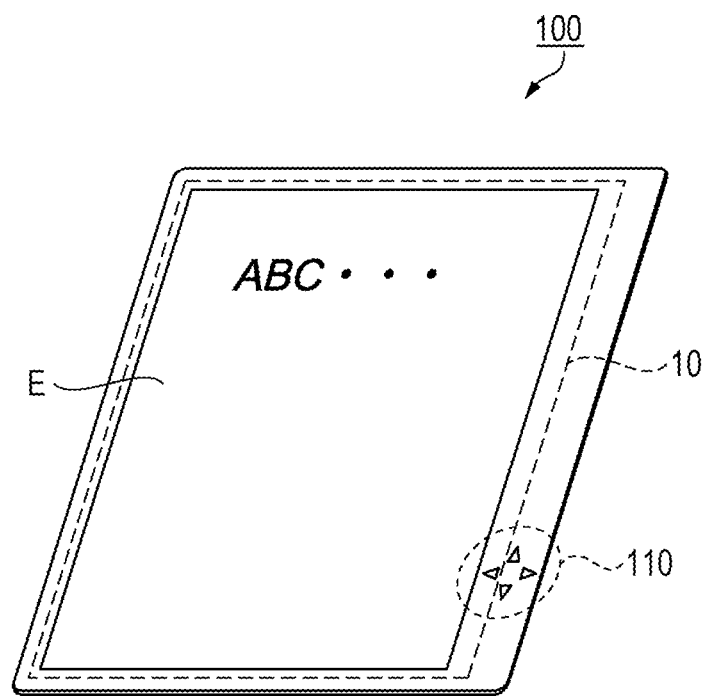
FIG. 1 is a perspective view illustrating an embodiment of an electronic apparatus to which the electrophoresis display device of an aspect of the invention is mounted.

FIG. 1 is a perspective view illustrating an embodiment of an electronic apparatus to which the electrophoresis display device of an aspect of the invention is mounted. Moreover, the drawings to be used (including drawings illustrated in FIG. 1 and below) are displayed after being enlarged or reduced, as appropriate, so that the portions to be described are recognizable.

As illustrated in FIG. 1, the electronic apparatus 100 is provided with an electrophoresis display device 10 and an interface for operating the electronic apparatus 100. The interface, specifically, is an operating unit 110 formed of switches or the like.

The electrophoresis display device 10 is formed by the electrophoresis display device of the invention and is a display module having a display region E. The display region E is formed of a plurality of pixels, and an image is displayed on the display region E by the pixels being electrically controlled.

In addition to the electronic paper (electronic paper display: EPD) illustrated in FIG. 1, it is possible to apply the electronic apparatus 100 provided with the electrophoresis display device 10 to, for example, wrist-worn devices, smartphones, tablet terminals, televisions, view finder-type or direct-view monitor-type video tape recorders, car navigation systems, pagers, electronic organizers, calculators, electronic newspapers, word processors, personal computers, workstations, video phones, point of sale (POS) terminals, touch panels, and the like.

Electrophoresis Display Device

Next, the electrophoresis display device 10 which the electronic apparatus 100 includes will be described.

Figure 2:
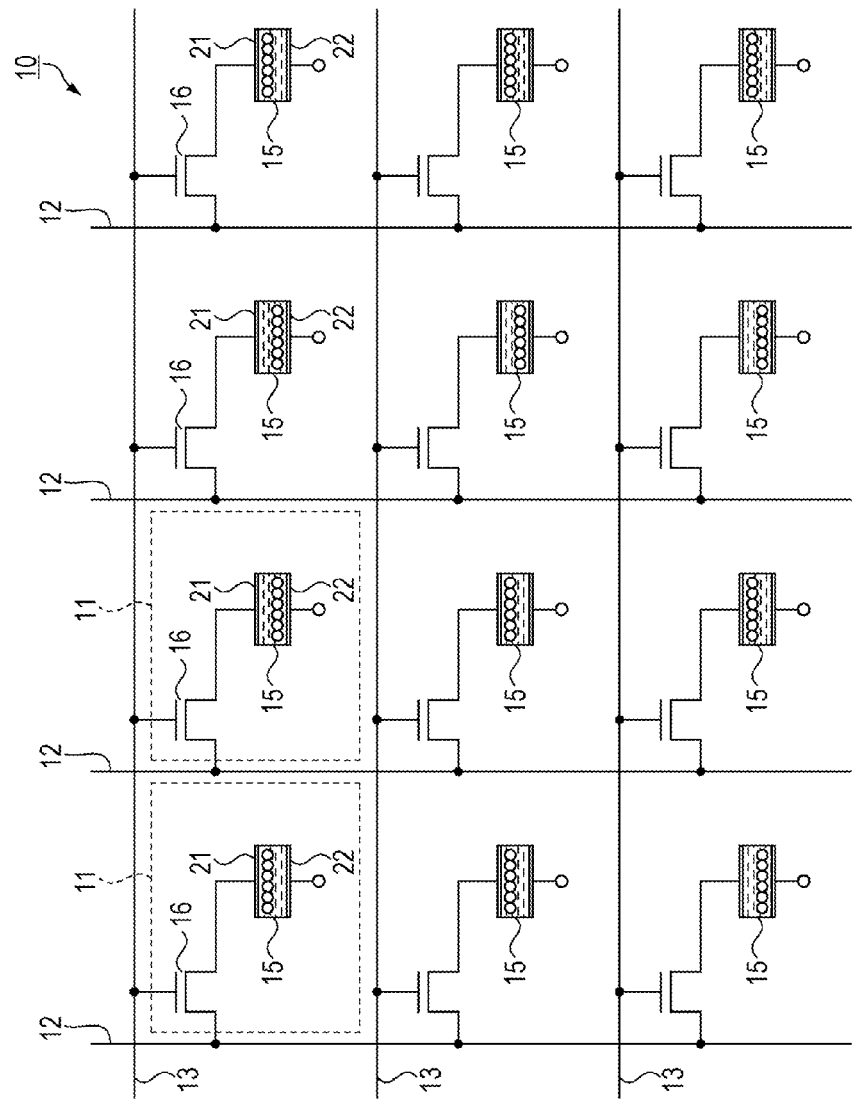
FIG. 2 is an equivalent circuit diagram illustrating an embodiment of an electrical configuration of the electrophoresis display device of the aspect of the invention.
Figure 3:
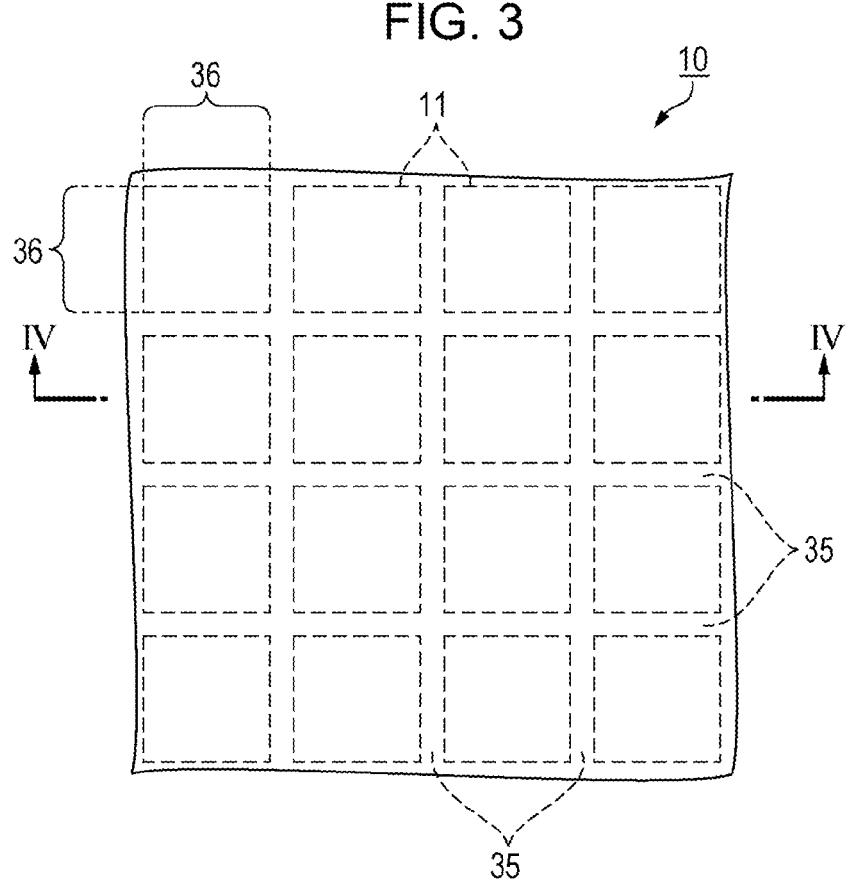
FIG. 3 is a schematic plan view illustrating an embodiment of a structure of the electrophoresis display device of the invention.
Figure 4:
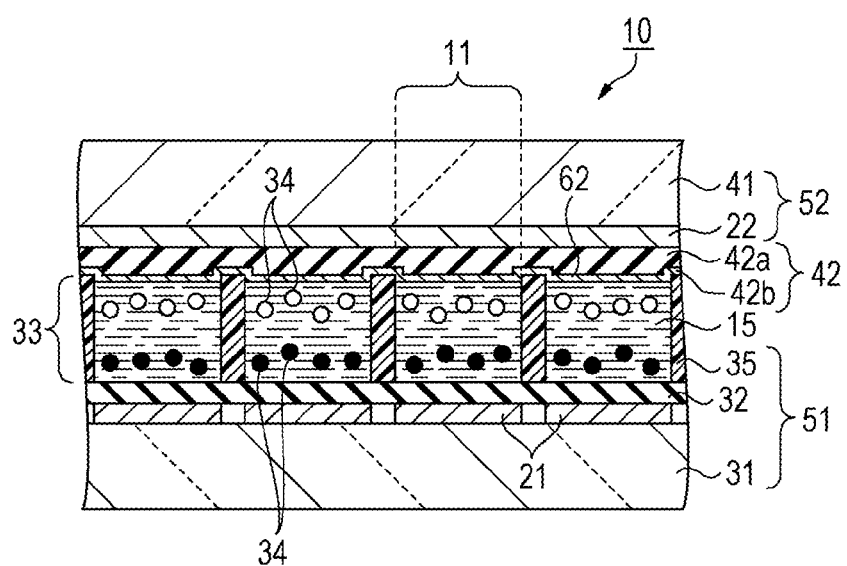
FIG. 4 is a cross-sectional view of the electrophoresis display device illustrated in FIG. 3 taken along line IV-IV.
Figure 5:
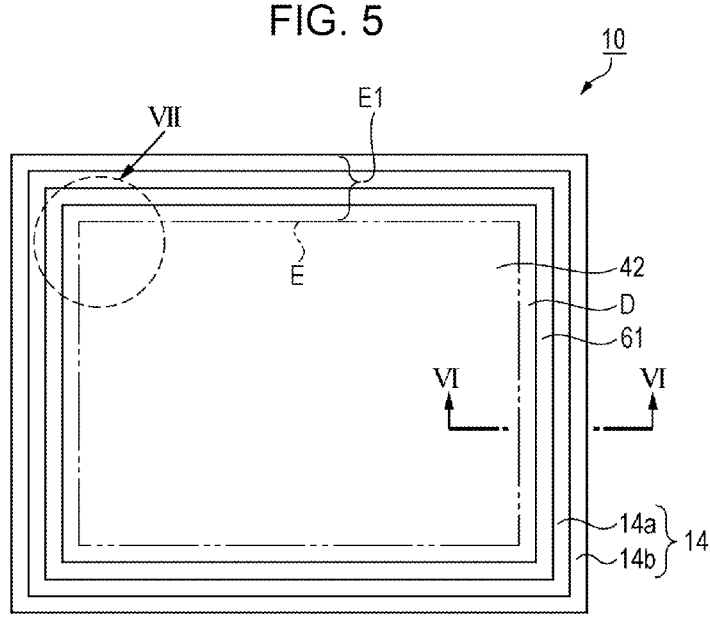
FIG. 5 is a schematic plan view illustrating the structure of a sealing layer and the periphery of a seal portion from the electrophoresis display device illustrated in FIG. 3.
Figure 6:
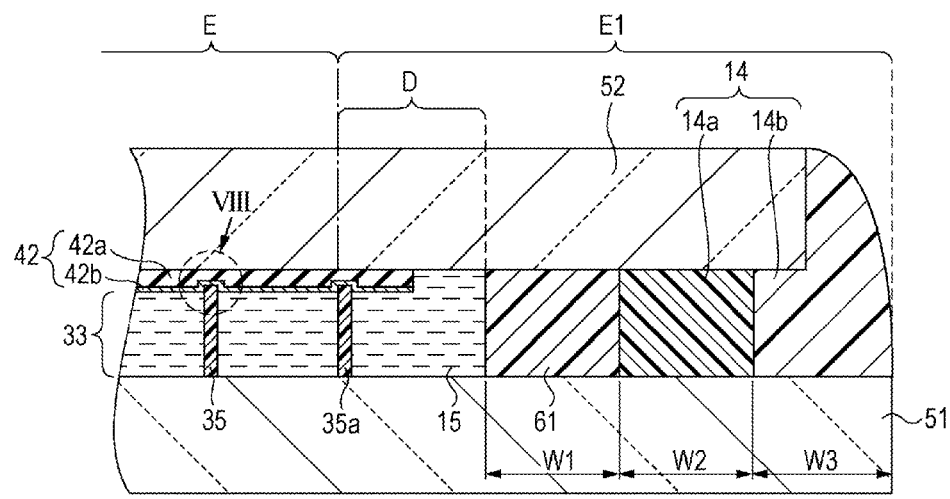
FIG. 6 is a cross-sectional view of the electrophoresis display device illustrated in FIG. 5 taken along line VI-VI.
Figure 7:
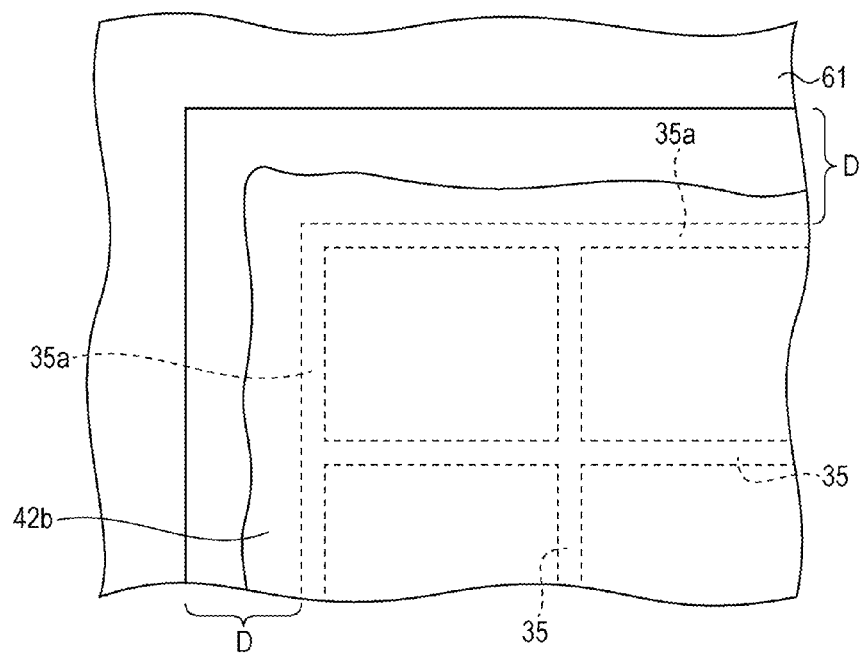
FIG. 7 is an enlarged plan view illustrating a portion VII of the electrophoresis display device illustrated in FIG. 5.
Figure 8:
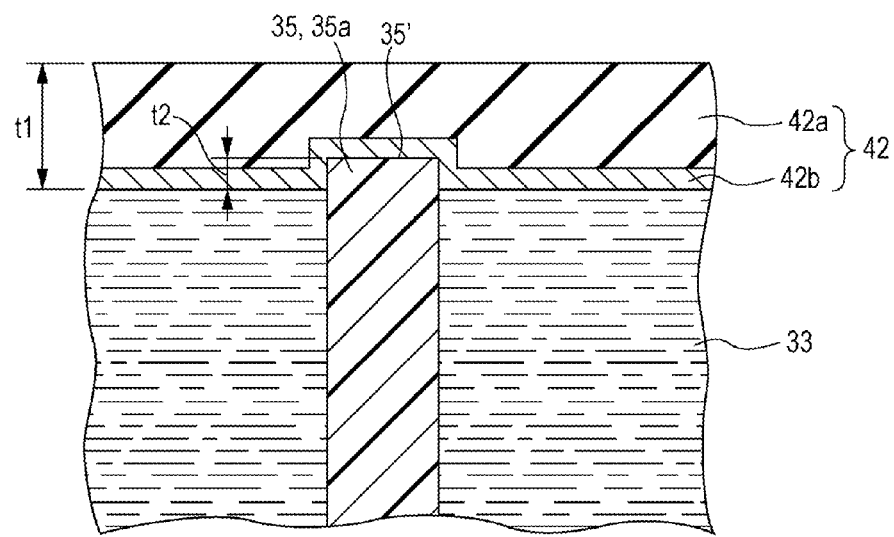
FIG. 8 is an enlarged cross-sectional view illustrating a portion VIII of the electrophoresis display device illustrated in FIG. 6.

FIG. 2 is an equivalent circuit diagram illustrating an embodiment of an electrical configuration of the electrophoresis display device of the aspect of the invention, FIG. 3 is a schematic plan view illustrating an embodiment of the structure of the electrophoresis display device of the invention, FIG. 4 is a cross-sectional view of the electrophoresis display device illustrated in FIG. 3 taken along line IV-IV, FIG. 5 is a schematic plan view illustrating the structure of the sealing layer and the periphery of a seal portion from the electrophoresis display device illustrated in FIG. 3, FIG. 6 is a cross-sectional view of the electrophoresis display device illustrated in FIG. 5 taken along line VI-VI, FIG. 7 is an enlarged plan view of a portion VII of the electrophoresis display device illustrated in FIG. 5, and FIG. 8 is an enlarged cross-sectional view of a portion VIII of the electrophoresis display device illustrated in FIG. 6. In FIGS. 5 to 8, insulating layers or wirings, electrodes, and the like are not depicted.

As illustrated in FIG. 2, the electrophoresis display device 10 includes a plurality of data lines 12 and a plurality of scanning lines 13, and pixels 11 are arranged at the portions at which the data lines 12 and the scanning lines 13 intersect. Specifically, the electrophoresis display device 10 includes a plurality of pixels 11 arranged in a matrix form along the data lines 12 and the scanning lines 13. Each pixel 11 includes a dispersion medium 15 that includes electrophoretic particles which is arranged between a pixel electrode 21 and a common electrode 22.

The pixel electrode 21 is connected to the data line 12 via a transistor 16 (TFT 16). The gate electrode of the TFT 16 is connected to the scanning line 13. FIG. 2 is an example, and other elements such as a storage capacitor may be incorporated, as necessary.

As illustrated in FIGS. 3 and 4, the electrophoresis display device 10 includes an element substrate (first substrate) 51, a counter substrate (second substrate) 52, and an electrophoresis layer 33.

A pixel electrode 21 is arranged to correspond to each pixel 11 on a first base material 31 that is formed of a glass substrate having transmissivity and that the element substrate 51 includes.

In detail, as illustrated in FIGS. 3 and 4, the pixels 11 (pixel electrodes 21) are formed in a matrix form in plan view. An optically transparent material, such as indium tin oxide (ITO: indium oxide to which tin is added) is used as the material of the pixel electrode 21.

A circuit portion, not shown, is provided between the first base material 31 and the pixel electrode 21 and the TFT 16 or the like is formed in the circuit portion. The TFT 16 is electrically connected to each pixel electrode 21 via a contact portion, not shown. Although not shown in the drawings, various wirings (for example, data lines 12 or scanning lines 13), elements (for example, capacitive elements), or the like are arranged in the circuit portion in addition to the TFT 16. A first insulating layer 32 is formed on the entire surface of the first base material 31 including on the pixel electrodes 21. A configuration in which the first insulating layer 32 is not provided may also be used.

Common electrodes 22 provided in common to correspond to the plurality of pixels 11 are formed on the second base material 41 (dispersion medium 15 side in FIG. 4) formed of a glass substrate having transmissivity which the counter substrate 52 includes. An optically transparent material, such as ITO, is used as a common electrode 22.

The first sealing layer 42a is formed on the common electrode 22. The second sealing layer 42b is formed on the first sealing layer 42a. The first sealing layer 42a and the second sealing layer 42b are combined and referred to as the sealing layer 42. The sealing layer 42 will be described in detail below.

The electrophoresis layer 33 is provided between the first insulating layer 32 and the sealing layer 42.

The electrophoresis layer 33 is formed by at least an electrophoresis dispersion liquid, which includes one or more electrophoretic particles 34, and a dispersion medium 15 in which the electrophoretic particles 34 are dispersed, and the space (region) partitioned (divided) by the first insulating layer 32, the second sealing layer 42b, and the dividing wall 35 (rib) provided on the first base material 31 is filled with the electrophoresis dispersion liquid (dispersion medium 15 and electrophoretic particles 34).

The dividing wall 35 is formed in a checkerboard pattern, as illustrated in FIG. 3. It is preferable that the dividing wall 35 be a transmissive material (such as an acrylic or an epoxy resin). The width of the dividing wall 35 is, for example, 5 μm.

In the embodiment, although a configuration is used in which a pixel electrode 21 is arranged at each pixel 11, and the dividing wall 35 (rib) is arranged at each pixel electrode 21, there is no limitation thereto, and a dividing wall (rib) may be formed for any plurality of pixels (for example, for every two to 20 pixels).

When the element substrate 51 and the counter substrate 52 are bonded together, by bringing the upper portion of the dividing wall 35 into contact with the counter substrate 52 (specifically, the sealing layer 42), it is possible to determine a cell gap between the element substrate 51 and the counter substrate 52 with the height of the dividing wall 35 (in practice, the frame dividing wall 61 illustrated in FIG. 6) as a reference.

Below, the region surrounded by the dividing wall 35 is referred to as a cell 36. One cell 36 includes a pixel electrode 21, a common electrode 22, and an electrophoresis layer 33.

The height of the dividing wall 35 is substantially the same as the height of the electrophoresis layer 33 divided by the height of the dividing wall 35 and is preferably set to, for example, 10 μm or more to 150 μm or less, more preferably 20 μm or more to 100 μm or less, and particularly preferably approximately 30 μm. Accordingly, white and black can be displayed with superior contrast by means of the movement of the electrophoretic particles 34.

In the embodiment, white particles and black particles are displayed as the electrophoretic particles 34, as illustrated in FIG. 4.

For example, when a voltage is applied between the pixel electrode 21 and the common electrode 22, the electrophoretic particles 34 undergo electrophoresis toward either electrode (pixel electrode 21, common electrode 22) according to the electrical field which arises therebetween. For example, in a case where the white particles have a positive charge, when the pixel electrode 21 is given a negative potential, the white particles move and gather on the pixel electrode 21 side (lower side), thereby displaying black. Conversely, when a positive potential is applied to the pixel electrode 21, the white particles move and gather on the common electrode 22 side (upper side), thereby displaying white. In this way, desired information (an image) is displayed according to the presence or absence and the number or the like of the white particles that collect on the electrode on the display side. Here, although white particles and black particles are used as the electrophoretic particles 34, other colored particles may be used.

It is possible to use inorganic pigment-based particles, organic pigment-based particles, polymer fine particles, or the like as the electrophoretic particles 34, and two or more types of various particles may be mixed and used. Electrophoretic particles 34 with an average particle diameter of approximately 0.05 μm or more to 10 μm or less are used, and using particles of approximately 0.2 μm or more to 2 μm or less is preferable.

The content of the white particles is within 30% of the total content of the dispersion medium 15, the white particles, and the black particles, that is, the electrophoresis dispersion liquid, and the content of the black particles is within 10% of the total content of the dispersion medium 15, the white particles and the black particles, that is, the electrophoresis dispersion liquid. Through this allocation, the white reflectivity becomes 40% or more and the black reflectivity becomes 2% or less, and it is possible to increase the display characteristics.

In the embodiment, a silicone oil in which the electrophoretic particles 34 are able to move even at a temperature of approximately −30° C. is used as the dispersion medium 15. The viscosity of the silicone oil is, for example, 10 cP or less. Since the silicone oil is a low viscosity solvent, for example, it is possible for the electrophoretic particles to migrate between electrodes at speeds of 500 ms or less even at a low temperature of approximately −30° C.

In addition to silicone oil, it is possible to use alcohols such as butanol and glycerin, cellosolves such as butyl cellosolves, esters such as butyl acetate, ketones such as dibutyl ketone, aliphatic hydrocarbons (liquid paraffin) such as pentane, and nitriles such as acetonitrile as the dispersion medium 15.

As illustrated in FIGS. 5 and 6, the electrophoresis display device 10 includes a display region E and a frame region E1 that surrounds the display region E. A dummy pixel region D, which is an area in the electrophoresis layer 33 that does not contribute to display, a frame dividing wall 61 arranged on the outside of the dummy pixel region D, and a seal portion 14 arranged on the outside of the frame dividing wall 61 are included in the frame region E1.

The width of the frame region E1 is, for example, approximately 1 mm. The width D of the dummy pixel region is, for example, 80 μm. On the display region E side of the dummy pixel region D, the rib width (width of the apex 35') of the dividing wall provided on the dividing wall 35a formed in the same shape as the dividing wall 35 arranged in the display region E is approximately 3 μm or more to 10 μm or less, and in the embodiment, is 5 μm. The distance between adjacent dividing walls is, for example, 150 μm.

The frame dividing wall 61 is provided on the outside of the dummy pixel region D. The frame dividing wall 61 is used in order to adjust the cell gap, is able to contain the dispersion medium 15 so as to not flow out to the outside, and is arranged so as to surround the dummy pixel region D. The frame dividing wall 61 is usually formed of the same material as the dividing wall 35 of the display region E.

The width W1 of the frame dividing wall 61 is, for example, 100 μm. The thickness of the frame dividing wall 61 is, for example, in a range of 10 μm to 50 μm, and is 33 μm in the embodiment.

The frame dividing wall 61 is also used so that adjacently arranged first seal materials 14a do not protrude into the display region E.

In the embodiment, the seal portion 14 includes a first seal material 14a and a second seal material 14b, as illustrated in FIG. 6. The first seal material 14a is used in order to provide adhesiveness when the element substrate 51 and the counter substrate 52 are bonded together and is provided so as to surround the frame dividing wall 61.

The width W2 of the first seal material 14a is, for example, 400 μm. The viscosity of the first seal material 14a is 300,000 Pa·s or more to 1,000,000 Pa·s or less, and preferably approximately 400,000 Pa·s. When the element substrate 51 and the counter substrate 52 are bonded together by using such a viscous first seal material 14a, it is possible to maintain a large contact area between the element substrate 51 and the counter substrate 52.

The second seal material 14b is used in order to seal the space between the element substrate 51 and the counter substrate 52 and is arranged so as to surround the first seal material 14a.

The width W3 of the second seal material 14b is, for example, 400 μm. The viscosity of the second seal material 14b is 100 Pa·s or more to 500 Pa·s or less, and preferably approximately 400 Pa·s. By using such a viscous second seal material 14b, the second seal material can be introduced between the element substrate 51 and the counter substrate 52 on the periphery of the first seal material 14a. Therefore, it is possible for the adhesive strength of the second seal material 14b to be improved. Infiltration of moisture from the exterior to the interior via the second seal material 14b and the first seal material 14a can be suppressed, and it is possible to obtain a highly reliable seal structure.

The seal portion 14 may be formed by a single second seal material 14b without including the first seal material 14a according to the constituent material of the second seal material 14b, in addition to the case of providing the first seal material 14a and the second seal material 14b as separate bodies.

As illustrated in FIGS. 6 and 8, the sealing layer 42 is provided between the apex 35' of the dividing wall 35 and the counter substrate 52 in the display region E.

Accordingly, by a space (closed space) partitioned by the sealing layer 42, the first insulating layer 32, and the dividing wall 35 (rib) being formed and the space being filled with the electrophoresis dispersion liquid which include the dispersion medium 15 and the electrophoretic particles 34, the dispersion medium 15 and the electrophoretic particles 34 do not enter and exit between adjacent cells 36.

The sealing layer 42 has a modulus of elasticity at room temperature (25° C.) of 1 MPa or more to 100 MPa or less.

Here, as described above, although expansion and contraction in the volume of the electrophoresis dispersion liquid occurs in the electrophoresis display device due to temperature changes in the environment, even if the sealing properties of the space are high, the volume of the electrophoresis dispersion liquid may contract and air bubbles may be generated due to the contraction, particularly at low temperatures.

As the air bubbles, vacuum bubbles due to contraction of the volume of the electrophoresis dispersion liquid occur by removing the gas component from the structural material which forms the electrophoresis dispersion liquid. Therefore, even when the temperature returns to room temperature (25° C.) from a low temperature, air bubbles remain in the electrophoresis dispersion liquid and, as a result, a problem arises where the display characteristics of the electrophoresis dispersion device decline remarkably.

In contrast, in the invention, the modulus of elasticity at room temperature (25° C.) of the sealing layer 42 is 1 MPa or more to 100 MPa or less and the sealing layer 42 has superior flexibility. Therefore, even if the electrophoresis layer 33 (electrophoresis dispersion liquid) contracts in volume due to the electrophoresis display device 10 being exposed to low temperatures (for example, approximately −30° C.) environment, it is possible for the sealing layer 42 to deform in accordance with the contraction in volume. Accordingly, since the generation of air bubbles from the dispersion liquid due to the contraction of the volume can be effectively suppressed or prevented, superior display qualities can be maintained in the electrophoresis display device 10 over the long term.

However, although the modulus of elasticity at 25° C. of the sealing layer 42 may be 1 MPa or more to 100 MPa or less, 5 MPa or more to 40 MPa or less is preferable and 5 MPa or more to 15 MPa or less is more preferable. Accordingly, it is possible for the effects to be more remarkably exhibited.

The average film thickness t1 of the sealing layer 42 is preferably ⅕ or more of the average film thickness of the electrophoresis layer 33, and a thickness of ⅕ or more to ½ of less is more preferable. When the average film thickness of the sealing layer 42 is less than the lower limit value, because the thickness of the sealing layer 42 becomes too thin even if the sealing layer 42 deforms in accordance with the modulus of elasticity of the sealing layer 42, there is concern of the sealing layer 42 being unable to sufficiently deform and of air bubbles being generated in the electrophoresis layer 33 in response to the contraction of the volume of the electrophoresis layer 33. When the average film thickness of the sealing layer 42 exceeds the upper limit value, even if the film thickness of the sealing layer 42 becomes thicker, there is concern of not only it being difficult to expect further improvements in the tracking of the sealing layer 42 but also the resistance value in the sealing layer 42 increasing excessively stemming from the thick sealing layer 42 being inserted between the pixel electrode 21 and the common electrode 22, and of the mobility of the electrophoretic particles 34 in the electrophoresis layer 33 being lowered.

Specifically, the average film thickness t1 of the sealing layer 42 is preferably approximately 2.5 μm or more to 30 μm or less, and approximately 2.5 μm or more to 10 μm or less is more preferable. In the embodiment, the average film thickness is 5 μm.

Furthermore, it is preferable that the sealing layer 42 have a volume resistivity is lower than the volume resistivity of the electrophoresis dispersion liquid. Accordingly, even if the sealing layer 42 is inserted between the pixel electrode 21 and the common electrode 22, it is possible to effectively suppress or prevent a lowering of the mobility of the electrophoretic particles 34 in the electrophoresis layer 33 stemming form the resistance value in the sealing layer 42 increasing excessively. Specifically, the volume resistivity of the sealing layer 42 is preferably $1 \times 10^7$ Ω·cm or more to $1 \times 10^{12}$ Ω·cm or less, and $1 \times 10^8$ Ω·cm or more to $1 \times 10^{10}$ Ω·cm or less is more preferable.

Here, as illustrated in FIGS. 6 and 8, the portion that overlaps the dividing wall 35 in plan view from the contact surface (contact surface of the first sealing layer 42a and the second sealing layer 42b) of the sealing layer 42 and the electrophoresis layer 33 is positioned closer to the second base material 41 (counter substrate 52) side in cross-sectional view than the part that does not overlap the dividing wall 35 in plan view and, Accordingly, the apex 35' of the dividing wall 35 bites into the sealing layer 42. In this way, by causing the apex 35' to bite into the sealing layer 42, it is possible to effectively suppress or prevent entering and exiting of the electrophoresis dispersion liquid that fills the closed space divided by the sealing layer 42, the first insulating layer 32, and the dividing wall 35 between cells 36 adjacent to one another.

Furthermore, in the embodiment, when the part (part not overlapping the dividing wall 35 in plan view) not bitten into by the apex 35' and the apex 35' from the contact surface of the first sealing layer 42a and the second sealing layer 42b are compared, the apex 35' is positioned closer to the second base material 41, as illustrated in FIG. 8. The biting amount t2 into the sealing layer 42 of the dividing wall 35, that is, the distance between the portion not bitten into by the apex 35' and the apex 35' from the surface of the electrophoresis layer 33 side of the second sealing layer 42b is preferably 1 μm to 5 μm and is 2 μm in the embodiment. In this way, it is possible for the effect obtained by the apex 35' being caused to be bite into the sealing layer 42 to be more remarkably exhibited.

In the embodiment, such a sealing layer 42 is formed by a stacked body in which the first sealing layer 42a and the second sealing layer 42b are stacked in this order from the counter substrate 52 side, as described in FIG. 4.

In such a stacked body, the modulus of elasticity of the first sealing layer 42a is preferably 5 MPa or more to 40 MPa or less. In the embodiment, the modulus of elasticity at room temperature (25° C.) is 20 MPa. The modulus of elasticity of the second sealing layer 42b is preferably 50 MPa or more to 10 GPa or less. By the first sealing layer 42a and the second sealing layer 42b having a modulus of elasticity as described above, it is possible to easily set the modulus of elasticity of the stacked body, that is, the entire sealing layer 42, within a range of 1 MPa or more to 100 MPa or less and possible to cause the apex 35' of the dividing wall 35 to bite into the sealing layer 42 (cause the sealing layer 42 to be deformed by the apex 35' of the dividing wall 35), without the apex 35' of the dividing wall 35 being folded back and the second sealing layer 42b being damaged.

The thickness of the first sealing layer 42a is preferably 2.5 μm or more to 20 μm or less, and the thickness of the second sealing layer 42b is preferably 0.05 μm or more to 1.0 μm or less. In the embodiment, the thickness of the first sealing layer 42a is 4.5 μm, and the thickness of the second sealing layer 42b is 0.5 μm. Accordingly, it is possible to easily set the modulus of elasticity of the stacked body of the first sealing layer 42a and the second sealing layer 42b, that is, the entire sealing layer 42, to within a range of 1 MPa or more to 100 MPa or less. In a case where the thickness of the second sealing layer 42b is 0.5 μm or lower, even if the modulus of elasticity of the second sealing layer 42b increases to approximately 10 GPa and the second sealing layer 42b is hard, the modulus of elasticity of the entire sealing layer 42 may not be influenced.

In a case where the film thickness of the first sealing layer 42a and the second sealing layer 42b is set as above, it is preferable for the first sealing layer 42a to be formed of a softer material (lower modulus of elasticity) than the second sealing layer 42b, that is, the modulus of elasticity of the first sealing layer 42a is lower than the modulus of elasticity of the second sealing layer 42b. Accordingly, even if the width of the apex 35' of the dividing wall 35 is made more fine to be within a range of 3 μm to 10 μm, it is possible to cause the apex 35' of the dividing wall 35 to bite into the sealing layer 42 (cause sealing layer 42 to be deformed by the apex 35' of the dividing wall 35) without the apex 35' being folded back or the second sealing layer 42b being damaged (the second sealing layer 42b being damaged by the apex 35').

The volume resistivity of the first sealing layer 42a is preferably $1\times10^7$ Ω·cm or more to $5\times10^{10}$ Ω·cm or less and the volume resistivity of the second sealing layer 42b is preferably $1\times10^7$ Ω·cm or more to $2\times10^{11}$ Ω·cm or less. Since it is possible to easily set the volume resistivity of the stacked body, that is, the entire sealing layer 42, to within a range of $1\times10^7$ Ω·cm or more to $1\times10^{12}$ Ω·cm or less by the first sealing layer 42a and the second sealing layer 42b having the above-described volume resistivity, it is possible to effectively suppress or prevent a lowering of the mobility of the electrophoretic particles 34 stemming from the sealing layer 42 being inserted between the pixel electrode 21 and the common electrode 22.

In the sealing layer 42 (stacked body) as described above, a material which more flexible than the second sealing layer 42b and is easily bitten into by the apex 35' of the dividing wall 35 is preferably used for the first sealing layer 42a, specific examples of the constituent material of the first sealing layer 42a include acrylonitrile-butadiene rubber (NBR), urethane rubber, isoprene rubber, butadiene rubber, chloroprene rubber, styrene-butadiene rubber, hydrin rubber, and nitrile rubber, and it is possible to use these individually or as a combination of two or more types. Among these, NBR or hydrin rubber is preferable. According to the NBR and hydrin rubber, through changes to the vulcanization conditions and addition of a filler to the first sealing layer 42a, it is possible to easily adjust the modulus of elasticity of the first sealing layer 42a. Accordingly, it is possible to cause the apex 35' to bite into the sealing layer 42 and to more reliably set the modulus of elasticity of the sealing layer 42 to within a range of 1 MPa or more to 100 MPa or less.

Examples of the filler added to the first sealing layer 42a include silica, mica, alumina, titanium oxide, and silicon nitride and it is possible to use these individually or as a combination of two or more types.

The constituent material of the second sealing layer 42b is selected so that the second sealing layer 42b is able to function as a sealing layer so that the first sealing layer 42a does not elute in the dispersion medium 15, specifically, examples of the constituent material of the second sealing layer 42b include non-polar polymers such as polyethylene and polypropylene, in addition to polyvinyl alcohol (PVA), and it is possible to use these individually or as a combination of two or more types. Among these, PVA is preferable. Such materials (in particular, PVA) are able to favorably reduce defects in the electrophoresis display device 10, since there is little concern of the dispersion medium 15 eluting. Because PVA is a material with low adhesiveness, it is possible to prevent the electrophoretic particles 34 from fixing to the second sealing layer 42b.

An additive may be included in the second sealing layer 42b in order to soften the material of the second sealing layer 42b (lower the modulus of elasticity of the second sealing layer 42b). Examples of the additive include, for example, glycerin. It is preferable for the additive to be added to approximately 5 wt % or more to 50 wt % or less with respect to the solid content of the PVA. Accordingly, even if a material with a modulus of elasticity of 600 MPa or more is selected as the material of the second sealing layer 42b, it is possible for the material to be used as the second sealing layer 42b. In the embodiment, a material with a modulus of elasticity at room temperature of 75 MPa in which glycerin is added to PVA with a modulus of elasticity at room temperature (25° C.) of 692 MPa is used as the material of the second sealing layer 42b.

The additive is not limited to glycerin, and one type or a mixture of two or more types selected from polyethylene glycol, glycerin, urea, polyethylene oxide, and polypropylene glycol.

The light transmissivity of the sealing layer 42 is 99% for PVA, and 99% for NBR.

The sealing layer 42 may be formed by a single layer of the second sealing layer 42b without including the first sealing layer 42a or may be formed by a stacked body of three or more layers according to the constituent material of the second sealing layer 42b, in addition to providing a stacked body of the first sealing layer 42a and the second sealing layer 42b.

As illustrated in FIGS. 6 and 7, the end portion of the sealing layer 42 is arranged, for example, between the dividing wall 35a and the frame dividing wall 61 on the outermost periphery of the display region E, that is, in the range of the dummy pixel region D. The sealing layer 42 is slightly larger than the display region E and the end portion does not protrude into the display region E even if variations in the size arise.

In a case where an adhesive is used as the material that forms the sealing layer 42, there is concern of the adhesive attaching to the electrophoretic particles 34 included in the electrophoresis dispersion liquid and exerting an influence on the electrophoretic properties of the electrophoretic particles 34 due to the adhesive (for example, impurities such as a reactive monomer which is not completely cured) included in the adhesive layer eluting in the dispersion liquid. However, in the embodiment, the sealing layer 42 includes the first sealing layer 42a and the second sealing layer 42b and the second sealing layer 42b is arranged on a portion that comes in contact with the electrophoretic particles 34. Therefore, it is possible to mitigate such defects.

In a case where the sealing layer 42 is only formed by a (hard) material with a high modulus of elasticity, when the width of the apex 35' of the dividing wall 35 is too narrow, there is concern of the apex 35' being folded over without biting into the sealing layer 42. Thus, it is thought that a gap arises between the apex 35' of the dividing wall 35 and the sealing layer 42 and the electrophoretic particles 34 move between adjacent cells 36. However, it is possible to also suppress such defects by forming the sealing layer 42 with the first sealing layer 42a and the second sealing layer 42b and setting the respective moduli of elasticity and thicknesses to a suitable range, as in the embodiment.

Below, the method of manufacturing for manufacturing the electrophoresis display device 10 will be described.

Method of Manufacturing Electrophoresis Display Device

Next, the manufacturing method for manufacturing the above-described electrophoresis display device 10 will be described.

Figure 9:
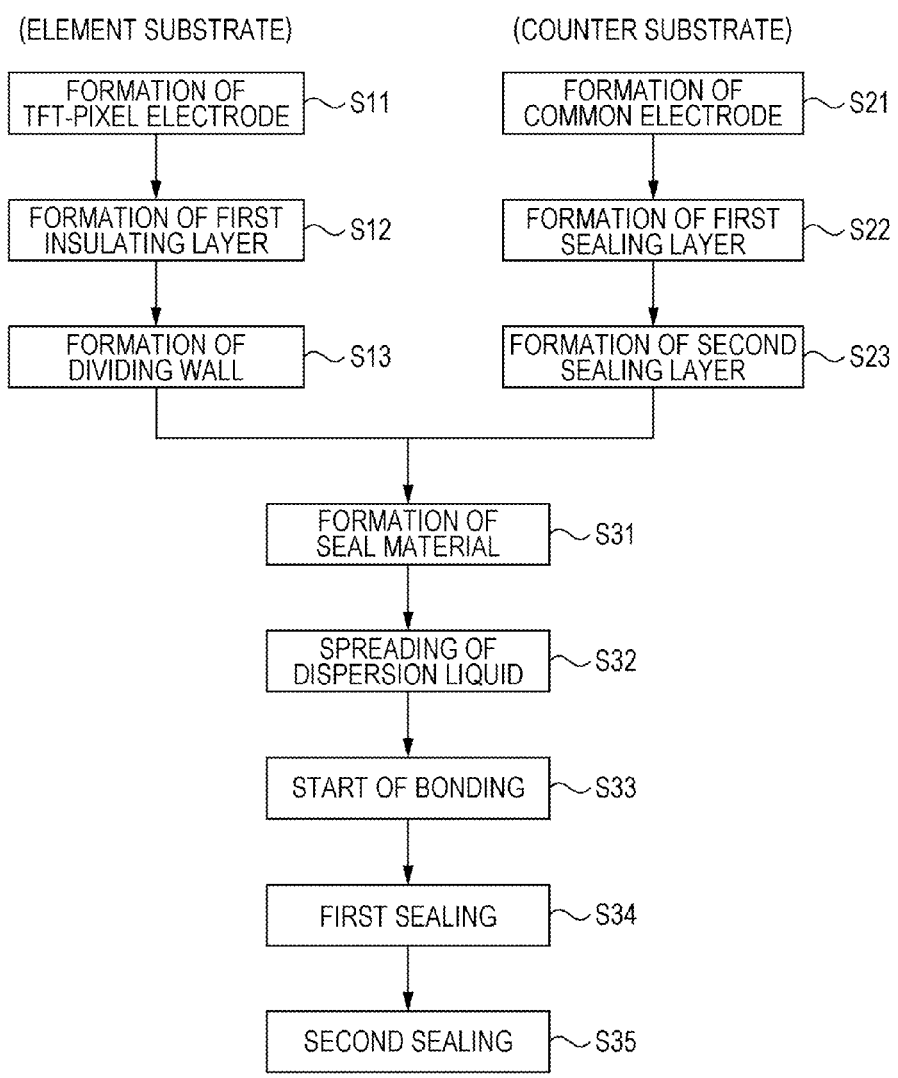
FIG. 9 is a flowchart illustrating, in processing order, a method of manufacturing an electrophoresis display device.

FIG. 9 is a flowchart illustrating, in processing order, a method of manufacturing an electrophoresis display device. FIGS. 10 to 17 are schematic cross-sectional views for describing the method of manufacturing the electrophoresis display device illustrated in FIG. 3.

Below, the method of manufacturing the electrophoresis display device will be described with reference to FIGS. 9 to 17.

[1] First, the method of manufacturing the element substrate 51 will be described with reference to FIG. 9.

[1-1] First, a TFT 16, a pixel electrode 21 formed of an optically transparent material such as ITO, and the like are formed on the first base material 31 formed of a light-transmissive material, such as glass (step S11).

Specifically, the TFT 16, the pixel electrode 21 and the like are formed on the first base material 31 using a known film forming technology, a photolithography technology, and an etching technology. In the description using the following cross-sectional views, the TFT 16, the pixel electrode 21, and the like will not be described or depicted.

[1-2] Next, the first insulating layer 32 is formed on the first base material 31 (step S12).

The method of manufacturing the first insulating layer 32 is not particularly limited, and it is possible to form the first insulating layer by spreading an insulating material on the first base material 31 using a spin coating method or the like and, thereafter, drying the insulating material.

Figure 10:
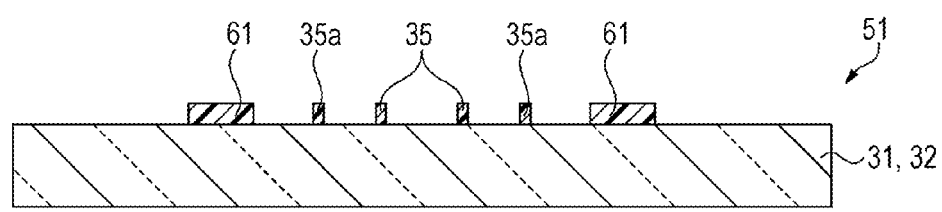
FIG. 10 is a schematic cross-sectional view for describing the method of manufacturing the electrophoresis display device illustrated in FIG. 3.

[1-3] Next, the dividing wall 35 is formed on the first base material 31 (specifically, the first insulating layer 32) as illustrated in FIG. 10 (step S13).

More specifically, the dividing wall 35 of the display region E, the dividing wall 35a on the outermost periphery of the display region E, and the frame dividing wall 61 provided on the outside thereof are formed at the same time.

It is possible for the dividing walls 35 and 35a, and the frame dividing wall 61 to be formed using a known film forming technology, a photolithography technology, and an etching technology.

In this way, it is possible to efficiently manufacture the dividing walls 35 and 35a, and the frame dividing wall 61 by being formed at the same time and with the same material.

Accordingly, the element substrate 51 is completed.

The dividing wall 35 is formed of a material that does not elute in the dispersion medium 15 and it is not important whether the material is an organic material or an inorganic material. Specifically, examples of the organic material include urethane resins, urea resins, acrylic resins, polyester resins, silicone resins, acrylic silicone resins, epoxy resins, polystyrene resins, styrene acrylic resins, polyolefin resins, butyral resins, vinylidene chloride resins, melamine resins, phenol resins, fluororesins, polycarbonate resins, polysulfone resins, polyether resins, polyamide resins, and polyimide resins. These are used as single resins or a composite agent of two or more types.

[2] Next, the method of manufacturing the counter substrate 52 will be described.

[2-1] First, the common electrode 22 is formed on the second base material 41 (step S21).

Specifically, the common electrode 22 is formed using a known film forming technology on the entire surface of the second base material 41 formed of a light-transmissive material, such as a glass substrate.

[2-2] Next, the sealing layer 42 (first sealing layer 42a and second sealing layer 42b) is formed on the common electrode 22 (step S22, step S23).

Figure 11:
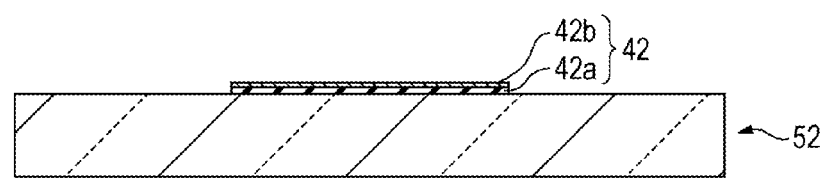
FIG. 11 is a schematic cross-sectional view for describing the method of manufacturing the electrophoresis display device illustrated in FIG. 3.

As the method of forming the first sealing layer 42a and the second sealing layer 42b, an NBR (acrylonitrile-butadiene rubber) film is formed on the counter substrate 52 with a coating method such as a spin coating method, and thereafter, a PVA (polyvinyl alcohol) film is similarly formed with a coating method as illustrated in FIG. 11. As described above, an additive such as glycerin is added to the PVA.

Furthermore, the first sealing layer 42a and the second sealing layer 42b are obtained by patterning the PVA and NBR in response to the shape of the first sealing layer 42a and the second sealing layer 42b to be formed using an etching method. There is no limitation to a coating method, and the layers may be formed using a printing method.

Through the above, the counter substrate 52 is completed.

[3] Next, the method by which the element substrate 51 and the counter substrate 52 are bonded will be described with reference to FIGS. 9 to 17.

Figure 12:
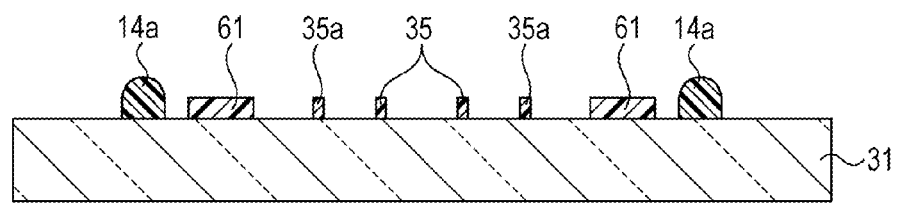
FIG. 12 is a schematic cross-sectional view for describing the method of manufacturing the electrophoresis display device illustrated in FIG. 3.

[3-1] First, the first seal material 14a is spread on the outer periphery of the frame dividing wall 61 in the atmosphere as illustrated in FIG. 12 (step S31).

The material of the first seal material 14a is Kayatoron which is a liquid epoxy resin with a comparatively high viscosity. The viscosity of the first seal material 14a is, for example, 300,000 Pa·s to 1,000,000 Pa·s, and preferably approximately 400,000 Pa·s. The width of the first seal material 14a when coated is sufficient to withstand a vacuum and, for example, is 400 μm.

Figure 13:
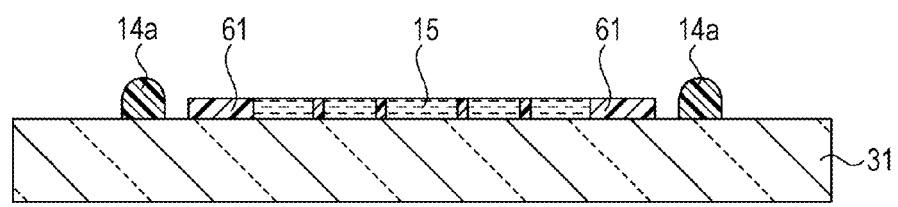
FIG. 13 is a schematic cross-sectional view for describing the method of manufacturing the electrophoresis display device illustrated in FIG. 3.

[3-2] Next, as illustrated in FIG. 13, an electrophoresis dispersion liquid containing electrophoretic particles 34 (white particles, black particles) and a dispersion medium 15 formed of silicone oil is spread on the display region E on the element substrate 51 (step S32).

The coating method uses, for example, a dispenser. It is also possible to apply a die coater or the like. The viscosity of the silicone oil is, for example, 10 cP or less. The amount of the dispersion medium 15 is an amount of liquid sufficient to be surrounded by the frame dividing wall 61 when the element substrate 51 and the counter substrate 52 are bonded. The height of the frame dividing wall 61 in the embodiment is, for example, 33 μm.

By the frame dividing wall 61 being formed, it is possible to prevent the first seal material 14a intruding being introduced (spreading) to the display region E side. It is possible to regulate the first seal material 14a so that the width does not spread greater than a predetermined width. Accordingly, it is possible to sufficiently ensure the strength of the first seal material 14a.

[3-3] Next, as illustrated in FIG. 14, bonding of the element substrate 51 and the counter substrate 52 is started (step S33).

In order to prevent air bubbles from mixing into the cell 36, the bonding is performed by pressing the substrates in a vacuum or negative pressure environment. However, since the silicone oil is highly volatile, the silicone oil enters a rough vacuum state which is lower than atmospheric pressure. Specifically, the pressure is, for example, 500 Pa.

[3-4] Next, as illustrated in FIG. 15, the dispersion medium 15 (electrophoresis dispersion liquid) is sealed between the element substrate 51 and the counter substrate 52 (first sealing; step S34).

That is, the element substrate 51 and the counter substrate 52 are bonded via the first seal material 14a in the rough vacuum state.

At this time, until the apex 35' of the dividing wall 35 bites into the sealing layer 42, in other words, when the portion which overlaps the dividing wall 35 in plan view and the portion which does not overlap the dividing wall 35 in plan view from the contact surface of the first sealing layer 42a and the second sealing layer 42b are compared, the counter substrate 52 is pressed to the element substrate 51 until the portion which overlaps the dividing wall 35 in plan view is positioned closer to the second base material 41 side than the portion which does not.

At this time, the frame dividing wall 61 also functions as a spacer which regulates the cell gap between the element substrate 51 and the counter substrate 52.

When the counter substrate 52 is pressed to the element substrate 51, the first seal material 14a is immersed and the dispersion medium 15 is pushed and loaded to the frame dividing wall 61 and the first seal material 14a. At this time, it is possible for the apex 35' of the dividing wall 35 provided in the display region E to prevent the dispersion medium 15 moving between adjacent cells 36 by biting into the sealing layer 42 provided on the counter substrate 52 side.

Thereafter, as illustrated in FIG. 16, if the first seal material 14a is an ultraviolet curable resin, the first seal material 14a is irradiated with ultraviolet rays and is cured. If the material is a thermosetting resin, the first seal material 14a is cured by heating.

The cell gap when the element substrate 51 and the counter substrate 52 are bonded is approximately 20 μm or more to 50 μm or less and is 33 μm in the embodiment. The width of the immersed first seal material 14a is 200 μm or more to 500 μm or less and is 400 μm in the embodiment.

[3-5] Next, as illustrated in FIG. 17, the second seal material 14b is formed and adhered to the outer periphery of the first seal material 14a in the atmosphere (second sealing; step S35).

Specifically, it is important that the second seal material 14b has a comparatively low viscosity without moisture being introduced, is introduced into the gap, and, for example, is an acrylic or epoxy resin. The viscosity of the second seal material 14b is lower than the viscosity of the first seal material 14a, for example, 100 Pa·s or more to 500 Pa·s or less, and is preferably 400 PA·s. The width of the second seal material 14b is, for example, 400 μm.

The method which spreads the second seal material 14b uses a dispenser, die coater or the like. Through the above, as illustrated in FIG. 17, the space which is pinched by the element substrate 51 and the counter substrate 52 is sealed. Thereafter, cutting into the shape of the product is performed, as necessary.

The electrophoresis display device 10 is obtained by passing through the above steps.

Above, the electrophoresis display device and electronic apparatus of the invention were described based on the embodiments in the drawings; however, the invention is not limited thereto and the configuration of each part may be replaced with an arbitrary configuration having the same function. Other arbitrary configurational parts may be added to the invention. Each of the above-described embodiments may be combined, as appropriate.

In the embodiment, although the dividing wall 35 is formed in a grid shape, the configuration (plan view shape) of the dividing wall 35 is not particularly limited. For example, a honeycomb shape, a polygonal shape, a round shape, a triangular shape, and the like may be formed.

There is no limitation to arranging the dividing wall 35 or the frame dividing wall 61 to the element substrate 51 side and the dividing wall 35 or the frame dividing wall 61 may be arranged on the counter substrate 52 side.

Furthermore, there is no limitation to forming the dividing wall 35 using a photolithography method and, for example, the dividing wall 35 may be formed by a printing process such as a nanoimprinting method, a screen printing method, a relief printing method, or a gravure printing method.

As long as the first base material 31 and the second base material 41 use a material having optical transparency on the display side, a plastic substrate may be used in addition to the glass substrate.

Furthermore, the frame dividing wall 61 is not limited to use as a spacer. In order to regulate the cell gap between the element substrate 51 and the counter substrate 52, the height of the frame dividing wall 61 may be the same as the height of the dividing wall 35 in a case where a separate material is provided as the spacer.

EXAMPLES

Next, specific examples the invention will be described.
1. Manufacturing of Evaluation Sample
Sample No. 1A <1> First, a glass substrate with an average thickness of 0.5 mm was prepared as the first base material 31. Next, after forming the resin layer (31 μm) formed by a urethane resin on the first base material 31, the dividing wall 35 with a width of 5 μm and a height of 31 μm was formed by etching the resin layer.

<2> Next, a glass substrate with an average thickness of 0.5 mm was prepared as the second base material 41. Next, the sealing layer 42 was formed by forming the first sealing layer 42a and the second sealing layer 42b on the second base material 41.

The formation of the first sealing layer 42a and the second sealing layer 42b is performed by forming an NBR film with a spin coating method on the second base material 41, and thereafter forming a PVA film with a spin coating method. The film thicknesses of the first sealing layer 42a and the second sealing layer 42b formed at this time are 2 μm and 0.3 μm, respectively. The modulus of elasticity at 25° C. of the first sealing layer 42a is 15 MPa.

<3> Next, Kayatoron, which is a liquid epoxy resin, is spread as the first seal material 14a on the outer periphery of the dividing wall 35 on the first base material 31. Thereafter, the concave portion formed by the first base material 31 and the dividing wall 35 were filled by spreading the electrophoresis dispersion liquid containing the electrophoretic particles 34 and the dispersion medium 15 (silicone oil, viscosity: 2 cps).

<4> Next, the second base material 41 on which the sealing layer 42 is formed in step <2> is bonded to the first base material 31, the interior of which is filled with the electrophoresis dispersion liquid in step <3>. The bonding was performed by curing the first seal material 14a by radiating ultraviolet rays after the counter substrate 52 is pressed to the element substrate 51 until the apex 35' of the dividing wall 35 bites into the sealing layer 42 in a vacuum or negative pressure environment of 500 Pa. The film thickness of the electrophoresis layer 33 formed by the apex 35' of the dividing wall 35 biting into the sealing layer 42 is 30 μm.

By passing through the above steps, the evaluation sample of sample No. 1A was manufactured.

Since the thickness of the second sealing layer 42b is 0.3 μm and the second sealing layer 42b is thinner than the first sealing layer 42a, in the embodiment, the modulus of elasticity of the second sealing layer 42b is not considered and the modulus of elasticity of the first sealing layer 42a is treated as the modulus of elasticity for the entire sealing layer 42.
Sample No. 1B Other than the first sealing layer 42a being formed using a hydrin rubber instead of NBR, the evaluation sample of sample No. 1B was manufactured similarly to the sample No. 1A. In the evaluation sample of sample No. 1B, the modulus of elasticity at 25° C. of the first sealing layer 42a is 5 MPa.
Sample No. 1C Other than forming the first sealing layer 42a in different vulcanization conditions to the hydrin rubber used in sample No. 1B, the evaluation sample of sample No. 1C was manufactured similarly to sample No. 1B. In the evaluation sample of sample No. 1C, the modulus of elasticity at 25° C. of the first sealing layer 42a is 40 MPa.

Sample No. 2A to 15A

Other than the film thickness of the first sealing layer 42a being changed as illustrated in Table 1, the evaluation samples of samples No. 2A to 15A were manufactured similarly to the sample No. 1A.

Sample No. 2B to 15B

Other than the film thickness of the first sealing layer 42a being changed as illustrated in Table 1, the evaluation samples of samples No. 2B to 15B were manufactured similarly to the sample No. 1B.

Sample No. 2C to 15C

Other than the film thickness of the first sealing layer 42a being changed as illustrated in Table 1, the evaluation samples of samples No. 2C to 15C were manufactured similarly to the sample No. 1C.

2. Evaluation 2-1. Evaluation of Response Speed

A voltage of 15V was applied between the first base material 31 and the second base material 41 for the evaluation samples of samples No. 5A, 10A, and 15A, respectively, and the response time (Tr) unit the white reflectivity reached 45% was measured.

As a result, in the evaluation samples of samples No. 5A, 10A, and 15A, the response times (Tr) become 180, 195, and 205 msec, respectively, even if the film thickness of the first sealing layer 42a is 30 μm, a response time able to withstand use is indicated.

Accordingly, it is estimated that the boundary value at which the electric resistance value of the sealing layer 42 increases due to the film thickness of the first sealing layer 42a increasing is 30 μm.

2-2. Evaluation of Air Bubble Generation

Whether air bubbles were generated in the electrophoresis layer after the temperature was lowered from a room temperature of 25° C. to a low temperature of −30° C. for the each evaluation sample of each sample No. was confirmed and a case where the generation of air bubbles was recognized was evaluated as B and a case where the generation of air bubbles was not recognized was evaluated as A.

Figure 18:
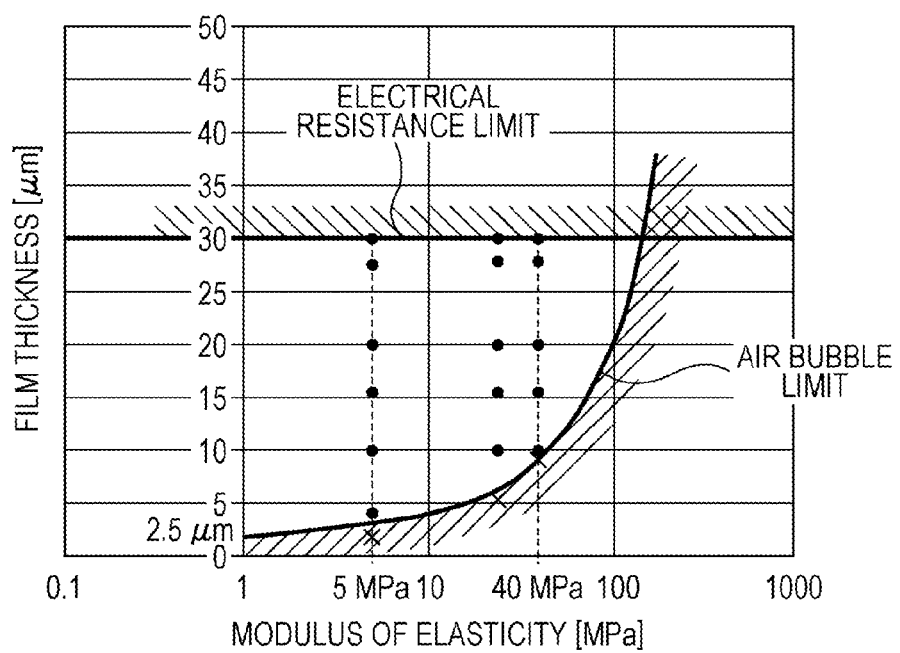
FIG. 18 is a graph illustrating the relationship between the presence or absence of air bubble generation and the modulus of elasticity and the film thickness of a first sealing layer in the evaluation sample of each sample No.

The measurement results thereof are illustrated in Table 1 and FIG. 18.

TABLE 1

| Thickness of First Sealing Layer [μm] | Ratio of Thickness of First Sealing Layer A and Electrophoresis Layer B (A/B) | Presence or Absence of Generation of Air Bubbles | | | | | |
|---|---|---|---|---|---|---|---|
| | | Modulus of Elasticity of First Sealing Layer [5 MPa] | | Modulus of Elasticity of First Sealing Layer [15 MPa] | | Modulus of Elasticity of First Sealing Layer [40 MPa] | |
| | | Sample No. | −30° C. | Sample No. | −30° C. | Sample No. | −30° C. |
| 2 | 0.07 | 1B | B | 1A | B | 1C | B |
| 4 | 0.13 | 2B | A | 2A | B | 2C | B |
| 6 | 0.20 | 3B | A | 3A | B | 3C | B |
| 8 | 0.27 | 4B | A | 4A | A | 4C | B |
| 10 | 0.33 | 5B | A | 5A | A | 5C | A |
| 12 | 0.40 | 6B | A | 6A | A | 6C | A |
| 14 | 0.47 | 7B | A | 7A | A | 7C | A |
| 16 | 0.53 | 8B | A | 8A | A | 8C | A |
| 18 | 0.60 | 9B | A | 9A | A | 9C | A |
| 20 | 0.67 | 10B | A | 10A | A | 10C | A |
| 22 | 0.73 | 11B | A | 11A | A | 11C | A |
| 24 | 0.80 | 12B | A | 12A | A | 12C | A |
| 26 | 0.87 | 13B | A | 13A | A | 13C | A |
| 28 | 0.93 | 14B | A | 14A | A | 14C | A |
| 30 | 1.00 | 15B | A | 15A | A | 15C | A |

As is clear from Table 1 and FIG. 18, by increasing the film thickness of the first sealing layer 42a, even if the modulus of elasticity increases, it is determined that the generation of air bubbles can be prevented. When the relationship between the presence or absence of air bubble generation and the modulus of elasticity and the film thickness of the first sealing layer 42a is estimated based on the graph illustrated in FIG. 18, it is thought that the bubble boundary at which the generation of air bubbles is prevented is represented by the secondary curve illustrated in FIG. 18.

Accordingly, since the boundary value of the electrical resistance value of the sealing layer 42 from the above-described evaluation of the response speed is 30 μm, it is clear that the generation of air bubbles in the electrophoresis layer can be effectively prevented by setting the film thickness of the sealing layer 42 in a range of a suitable range with the modulus of elasticity of the sealing layer 42 within a range of 1 MPa or more to 100 MPa or less.

The entire disclosure of Japanese Patent Application No. 2015-150060, filed Jul. 29, 2015 is expressly incorporated by reference herein.

What is claimed is:

1. An electrophoresis display device, comprising:
   a first substrate;
   a second substrate arranged facing the first substrate;
   an electrophoresis layer arranged between the first substrate and the second substrate and which includes a dispersion liquid that contains electrophoretic particles and a dispersion medium;
   a dividing wall arranged to partition the electrophoresis layer into a plurality of cells; and
   a sealing layer arranged between the second substrate and the dividing wall,
   wherein the sealing layer has a modulus of elasticity at 25° C. of 1 MPa or more to 100 MPa or less, and
   wherein a surface of the sealing layer which is in contact with the dividing wall and pressed by the dividing wall is positioned closer to a second substrate side in a cross-sectional view of the electrophoresis display device than a surface of the sealing layer which is in contact with the electrophoresis layer.

2. The electrophoresis display device according to claim 1,
wherein the sealing layer has an average film thickness of ⅕ or more of the average film thickness of the electrophoresis layer.

3. The electrophoresis display device according to claim 1,
wherein the sealing layer has a lower volume resistivity than the volume resistivity of the dispersion liquid.

4. The electrophoresis display device according to claim 1,
wherein the sealing layer is a stacked body that includes a first sealing layer positioned on the second substrate side and a second sealing layer positioned on the electrophoresis layer side.

5. The electrophoresis display device according to claim 4,
wherein the first sealing layer has a modulus of elasticity at 25° C. of 5 MPa or more to 40 MPa or less.

6. The electrophoresis display device according to claim 4,
wherein the second sealing layer has a modulus of elasticity at 25° C. of 50 MPa or more to 10 GPa or less.

7. The electrophoresis display device according to claim 4,
wherein the first sealing layer has an average film thickness of 2.5 μm or more to 20 μm or less.

8. The electrophoresis display device according to claim 4,
wherein the second sealing layer has an average film thickness of 0.05 μm or more to 1.0 μm or less.

9. The electrophoresis display device according to claim 4,
wherein the first sealing layer has a volume resistivity of $1\times10^7$ Ω·cm or more to $5\times10^{10}$ Ω·cm or less.

10. The electrophoresis display device according to claim 4,
wherein the second sealing layer has a volume resistivity of $1\times10^7$ Ω·cm or more to $2\times10^{11}$ Ω·cm or less.

11. An electronic apparatus, comprising:
the electrophoresis display device according to claim 1.

12. An electronic apparatus, comprising:
the electrophoresis display device according to claim 2.

13. An electronic apparatus, comprising:
the electrophoresis display device according to claim 3.

14. An electronic apparatus, comprising:
the electrophoresis display device according to claim 4.

15. An electronic apparatus, comprising:
the electrophoresis display device according to claim 5.

16. An electronic apparatus, comprising:
the electrophoresis display device according to claim 6.

17. An electronic apparatus, comprising:
the electrophoresis display device according to claim 7.

18. An electronic apparatus, comprising:
the electrophoresis display device according to claim 8.

* * * * *